United States Patent
Xia

(10) Patent No.: US 6,275,401 B1
(45) Date of Patent: *Aug. 14, 2001

(54) SELF-DRIVEN SYNCHRONOUS RECTIFICATION CIRCUIT FOR LOW OUTPUT VOLTAGE DC-DC CONVERTERS

(75) Inventor: Gang Xia, Weston, MA (US)

(73) Assignee: Power-One, Inc., Camarillo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,964

(22) Filed: Jan. 10, 2000

(51) Int. Cl.$^7$ .................................................. H02M 7/217
(52) U.S. Cl. ............................................. 363/127; 363/23
(58) Field of Search .................................. 363/15, 17, 22, 363/23, 125, 127, 53

(56) References Cited

U.S. PATENT DOCUMENTS

| | | |
|---|---|---|
| 5,343,383 | 8/1994 | Shinada et al. . |
| 5,457,624 | 10/1995 | Hastings . |
| 5,590,032 | 12/1996 | Bowman et al. . |
| 5,604,429 | 2/1997 | Nakashima . |
| 5,640,318 | 6/1997 | Leu . |
| 5,663,877 | 9/1997 | Dittli et al. . |
| 5,708,571 | 1/1998 | Shinada . |
| 5,726,869 | 3/1998 | Yamashita et al. . |
| 5,774,350 | 6/1998 | Notaro et al. . |

(List continued on next page.)

OTHER PUBLICATIONS

Yuri Panov et al, "Design and Performance Evaluation of Low–Voltage/High–Current Dc/Dc On–board Modules", Mar. 14–18, 1999, IEEE, pp. 545–552.*

(List continued on next page.)

*Primary Examiner*—Peter S. Wong
*Assistant Examiner*—Gary L. Laxton
(74) *Attorney, Agent, or Firm*—O'Melveny & Myers LLP

(57) ABSTRACT

A synchronous rectification circuit for a DC-DC power converter can operate efficiently with a primary drive voltage that remains at a zero voltage level during a portion of the power conduction cycle. The DC-DC power converter includes a primary side power circuit providing a symmetrically varying power signal that remains at a zero voltage level for a portion of a conduction cycle. A first secondary side power circuit is inductively coupled to the primary side power circuit, and has an output terminal that provides an output voltage. The first secondary side power circuit further comprises first and second synchronous rectifiers having respective activation terminals. The synchronous rectifiers are adapted to alternately activate in synchronism with non-zero voltage level portions of the conduction cycle. A second secondary side power circuit is inductively coupled to the first secondary side power circuit and has polarity reversed with respect to the first secondary side power circuit. The second secondary side power circuit comprises first and second switching devices having respective activation terminals respectively coupled to the activation terminals of the first and second synchronous rectifiers. The first and second switching devices are adapted to alternately activate in inverse synchronism with the non-zero voltage level portions of the conduction cycle. The first and second synchronous rectifiers are selected to have lower activation voltage thresholds than the first and second switching devices such that both the first and second synchronous rectifiers remains activated during a successive zero voltage level portion of the conduction cycle.

28 Claims, 3 Drawing Sheets

U.S. PATENT DOCUMENTS

| | | |
|---|---|---|
| 5,818,704 | 10/1998 | Martinez . |
| 5,867,378 | 2/1999 | Suarez et al. . |
| 5,870,031 | 2/1999 | Kaiser et al. . |
| 5,870,299 | 2/1999 | Rozman . |
| 5,872,705 | 2/1999 | Loftus, Jr. et al. . |
| 5,907,479 | 5/1999 | Leu . |
| 5,920,475 | 7/1999 | Boylan et al. . |
| 5,940,287 | 8/1999 | Brkovic . |

OTHER PUBLICATIONS

"New Driving Scheme for Self Driven Synchronous Rectifiers" by Cobos et al., 1999 IEEE, pp. 840–846.

"Design of Low Output Voltage DC/DC Converter for Telecom Application With a New Scheme for Self–Driven Synchronous Rectification" by Alou et al.,1999 IEEE, pp. 866–872.

* cited by examiner

US 6,275,401 B1

SELF-DRIVEN SYNCHRONOUS RECTIFICATION CIRCUIT FOR LOW OUTPUT VOLTAGE DC-DC CONVERTERS

BACKGROUND OF THE INVENTION

1. Field of the Invention

The present invention relates to DC-to-DC power converter circuits, and more particularly, to a self-driven synchronous rectifier circuit for use with a primary drive voltage that remains at a zero voltage level during a portion of the power conduction cycle.

2. Description of Related Art

Advancements in the electronic arts have resulted in increased integration of electronic devices onto reduced circuit form factors. This trend has driven a demand for power supplies that provide relatively low supply voltages, such as less than 3.3 volts. Such low voltage power supplies tend to have lower efficiency than higher voltage supplies due in part to the voltage drops across the semiconductor devices of the power supplies. One type of power conversion scheme, known as self-driven synchronous rectification, is known in the art for providing relatively high efficiency in low output power applications.

An example of a conventional self-driven synchronous rectification circuit 10 is illustrated in FIG. 1. The self-driven synchronous rectification circuit 10 is coupled to the secondary winding 12 of a transformer, and includes first and second rectifiers 14, 16 that are each provided by MOSFET devices. The first rectifier 14 has a drain terminal connected to a first end A of the secondary winding 12 and the second rectifier 16 has a drain terminal connected to a second end B of the secondary winding. The gate terminal of the first rectifier 14 is connected to the second end B of the secondary winding 12, and the gate terminal of the second rectifier 16 is connected to the first end A of the transformer secondary. The source terminals of the first and second rectifiers 14, 16 are each coupled to ground. As shown in FIG. 1, each of the first and second rectifiers 14, 16 include a respective body diode between drain and source terminals thereof. The synchronous rectification circuit 10 has an output terminal coupled to the first end A of the secondary winding 12 through a first output storage choke 22 and to the second end B of the secondary winding through a second output storage choke 24. An output voltage ($V_o$) may be derived across a load coupled between the output terminal and ground. A capacitor 26 is coupled between the output terminal and ground to filter high frequency components of the rectified output voltage.

The operation of the self-driven synchronous rectification circuit 10 of FIG. 1 is illustrated with respect to the driving voltage waveform of FIG. 2. In FIG. 2, the driving voltage between the A and B ends of the secondary winding 12 of the transformer ($V_{A-B}$) is depicted as a series of rectangular pulses having a predetermined duty cycle that alternate between a positive voltage and a negative voltage. Significantly, the voltage $V_{A-B}$ remains at the zero level during transitions between the positive and negative voltage portions of the power conduction cycle. During the positive portion of the conduction cycle (i.e., time $t_1$), the voltage at end A is positive with respect to the voltage at end B, causing the second rectifier 16 to turn on and the first rectifier 14 to turn off. This forms a current path through the transformer secondary winding 12, the first storage choke 22, and the second rectifier 16 to deliver output power to the load coupled between the output terminal and ground. Conversely, during the negative portion of the conduction cycle (i.e., time $t_3$), the voltage at end B is positive with respect to the voltage at end A, the first rectifier 14 is turned on and the second rectifier 16 is turned off. This forms a current path through the transformer secondary winding 12, the second storage choke 24, and the first rectifier 14 to deliver output power to the load coupled between the output terminal and ground. Thus, power is delivered to the secondary side of the transformer during both the positive and negative portions of the conduction cycle. Since the current flowing to the load is twice the current in the secondary winding 12, this particular form of synchronous rectification circuit is generally known as a "current doubler."

Ideally, the power conduction cycle is a perfect square wave with no zero voltage transition periods between the positive and negative portions of the cycle. With such an idealized conduction cycle, the gate drive of the rectifiers 14, 16 is synchronized with current flow through the body diodes of the MOSFET devices. This way, very little current flows through the body diodes of the devices when the rectifiers 14, 16 are shut off. It is undesirable for the body diodes of the rectifiers 14, 16 to conduct current during a substantial portion of the power conduction cycle since they cause a voltage drop that results in substantial power loss, i.e., reduced efficiency. In practice, however, such an idealized power conduction cycle is difficult to achieve, and there are inevitably zero voltage transition periods between the positive and negative portions of the power conduction cycle. The zero voltage transition periods provide a condition in which both rectifiers are turned off while current is still flowing through the synchronous rectification circuit, causing the current to flow through the body diodes of the rectifiers.

More particularly, during the first and second transition periods between the positive and negative portions of the conduction cycle (i.e., times $t_2$ and $t_4$), the driving voltage $V_{A-B}$ is zero and both the first rectifier 14 and the second rectifier 16 are turned off. Magnetization current of the first storage choke 22 is conducted through the body diode of the first rectifier 14, and magnetization current of the second storage choke 24 is conducted through the body diode of the second rectifier 16. The conduction of magnetization current through the body diodes of the rectifiers results in a substantial efficiency reduction of the synchronous rectification circuit.

Accordingly, it would be desirable to provide a self-driven synchronous rectification circuit that can operate efficiently with a primary drive voltage that remains at a zero voltage level during a portion of the power conduction cycle.

SUMMARY OF THE INVENTION

In accordance with the present invention, a DC-DC power converter is provided with a self-driven synchronous rectification circuit that can operate efficiently with a primary drive voltage that remains at a zero voltage level during a portion of the power conduction cycle. The present synchronous rectification circuit achieves improved efficiency over conventional synchronous rectification circuits by preventing the flow of current through the body diodes of the MOSFET synchronous rectifier devices while the primary drive voltage is at a zero voltage level.

More particularly, the DC-DC power converter includes a primary side power circuit providing a symmetrically varying power signal that remains at a zero voltage level for a portion of a conduction cycle. A first secondary side power circuit is inductively coupled to the primary side power circuit, and has an output terminal that provides an output voltage. The first secondary side power circuit further comprises first and second synchronous rectifiers having respective activation terminals. The synchronous rectifiers are adapted to alternately activate in synchronism with non-zero voltage level portions of the conduction cycle. A second secondary side power circuit is inductively coupled to the first secondary side power circuit and has polarity reversed with respect to the first secondary side power circuit. The second secondary side power circuit comprises first and second switching devices having respective activation terminals respectively coupled to the activation terminals of the first and second synchronous rectifiers. The first and second switching devices are adapted to alternately activate in inverse synchronism with the non-zero voltage level portions of the conduction cycle. The first and second synchronous rectifiers are selected to have lower activation voltage thresholds than the first and second switching devices such that both synchronous rectifiers remains activated during a successive zero voltage level portion of the conduction cycle.

The activation terminals of the first and second switching devices are at an equilibrium voltage close to the activation voltage threshold of the first and second switching devices during the zero voltage portions of the conduction cycle. The first and second switching devices thereby activate rapidly upon a transition to the non-zero voltage portions of the conduction cycle. The activation of one of the first and second switching devices following a transition to the non-zero voltage portions of the conduction cycle causes a deactivation of a corresponding one of the first and second synchronous rectifiers. The activation terminals of the first and second switching devices are coupled to the activation terminals of the second and first synchronous rectifiers, respectively.

A more complete understanding of the self-driven synchronous rectification circuit for low output voltage DC-DC converters will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a self-driven synchronous rectification circuit that can operate efficiently with driving voltages that remain at a zero voltage level during a portion of the power conduction cycle.

Figure 3:
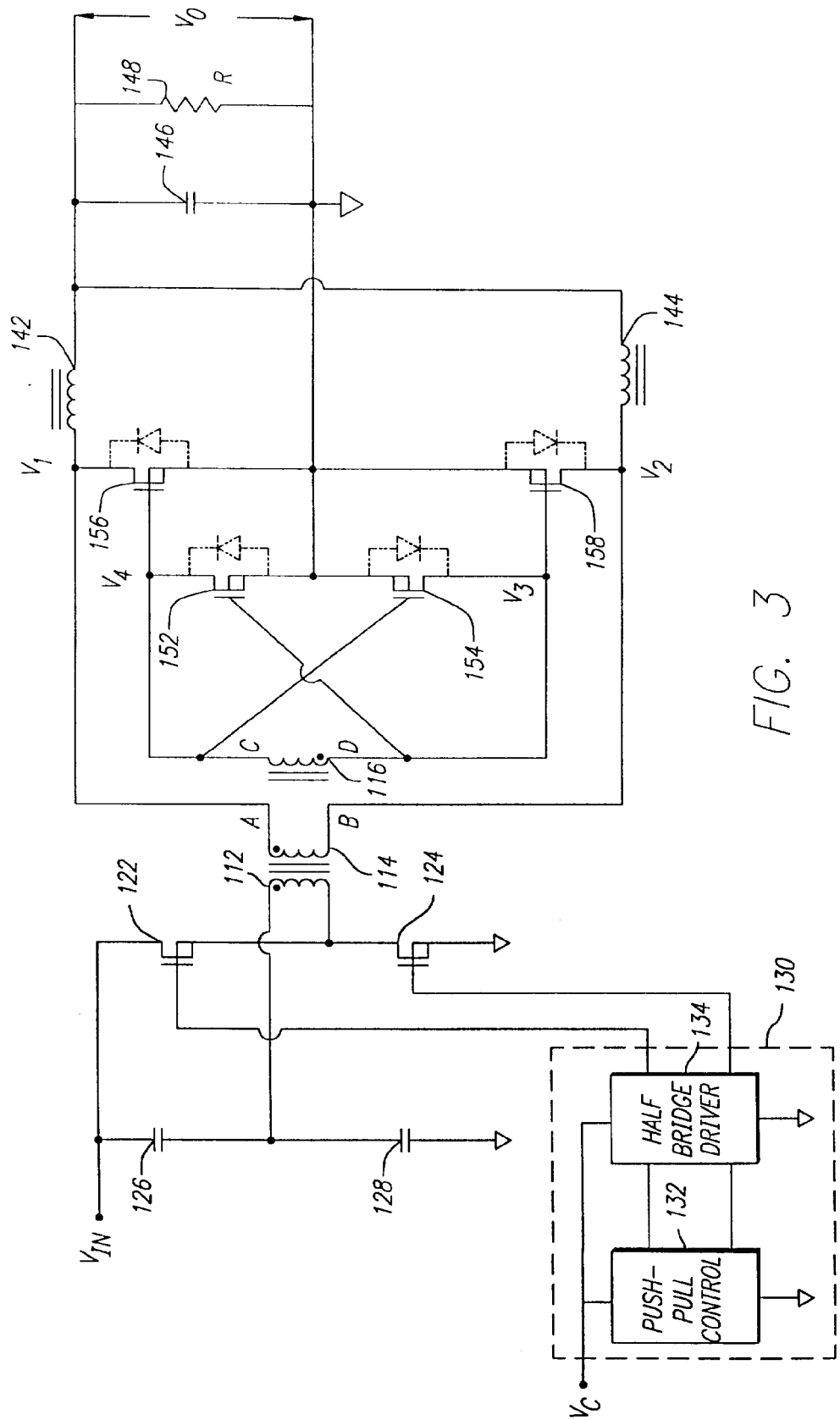
FIG. 3 is a schematic drawing of an exemplary DC-DC converter circuit incorporating a self-driven synchronous rectification circuit in accordance with the present invention.

Referring now to FIG. 3, an exemplary DC-DC converter circuit 100 is shown. The exemplary DC-DC converter circuit 100 comprises a transformer having a primary winding 112, a first secondary winding 114, and a second secondary winding 116. In a preferred embodiment of the present invention, the transformer provides a ratio of 4:1:1, although it should be appreciated that other transformer ratios could also be advantageously utilized. Moreover, the polarity of the second secondary winding 116 is reversed with respect to each of the primary winding 112 and the first secondary winding 114, as indicated by the placement of dots in the schematic drawing of FIG. 3 adjacent to the respective transformer windings.

On the primary side of the transformer, an exemplary half-bridge forward converter driving circuit is provided. The half-bridge driving circuit includes switches 122, 124 provided by MOSFET devices, capacitors 126, 128, and a timing control circuit 130. The capacitors 126, 128 are connected in series between an input voltage ($V_{IN}$), such as 48 volts, and ground. The first end of the transformer primary winding 112 is connected to a midpoint between the two capacitors 126, 128. The input voltage charges the capacitors 126, 128 so the midpoint is roughly half the input voltage, such as 24 volts. The first switch 122 has a source terminal connected to the input voltage and a drain terminal connected to the second end of the transformer primary winding 112. The second switch 124 has a source terminal connected to the second end of the transformer primary winding 112 and a drain terminal connected to ground. The gate terminals of the first and second switches 122, 124 are connected to the timing control circuit 130.

The timing control circuit 130 includes a push-pull controller 132 and a half-bridge driver 134. The push-pull controller 132 has a pair of outputs that are provided to the half-bridge driver, which in turn drives the gate terminals of each of the switches 122, 124. The push-pull controller 132 generates a duty cycle in which the outputs are out of phase and symmetrical, and the half-bridge driver 134 provides gate drive signals in accordance with the duty cycle. The timing control circuit 130 is further provided with a control voltage ($V_C$) that provides power to the push-pull controller 132 and the half-bridge driver 134.

Figure 1:
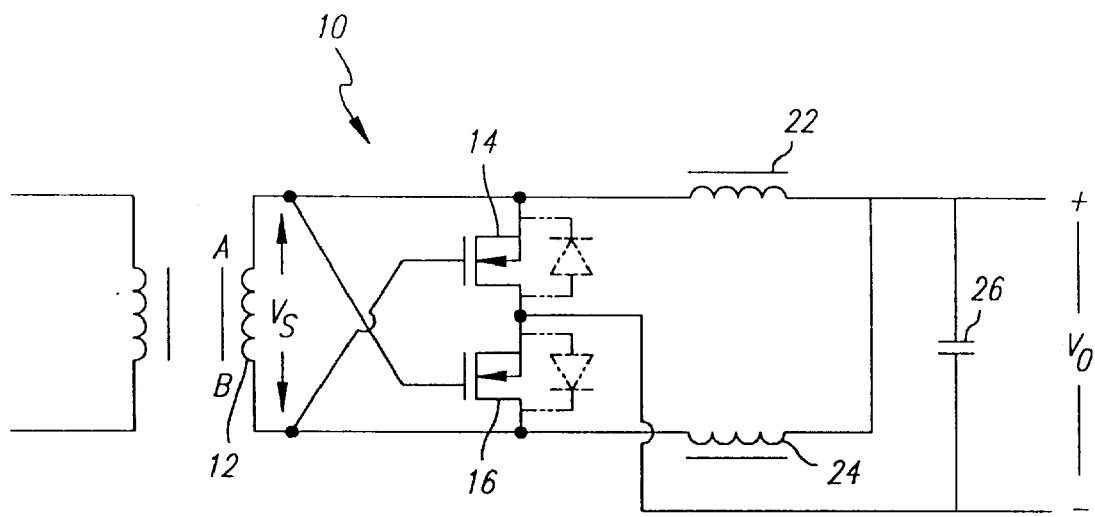
FIG. 1 is a schematic drawing of a prior art self-driven synchronous rectification circuit.
Figure 2:
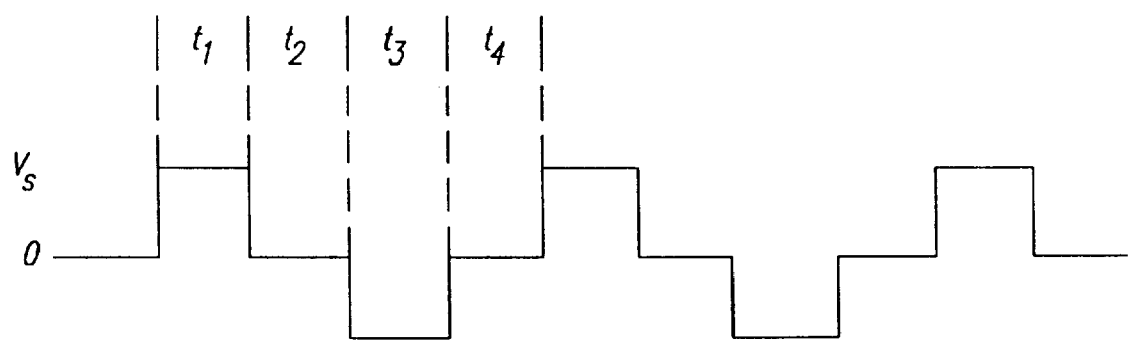
FIG. 2 illustrates a primary driving voltage waveform having zero voltage level transition periods between positive and negative voltage portions of the power conduction cycle.
Figure 4:
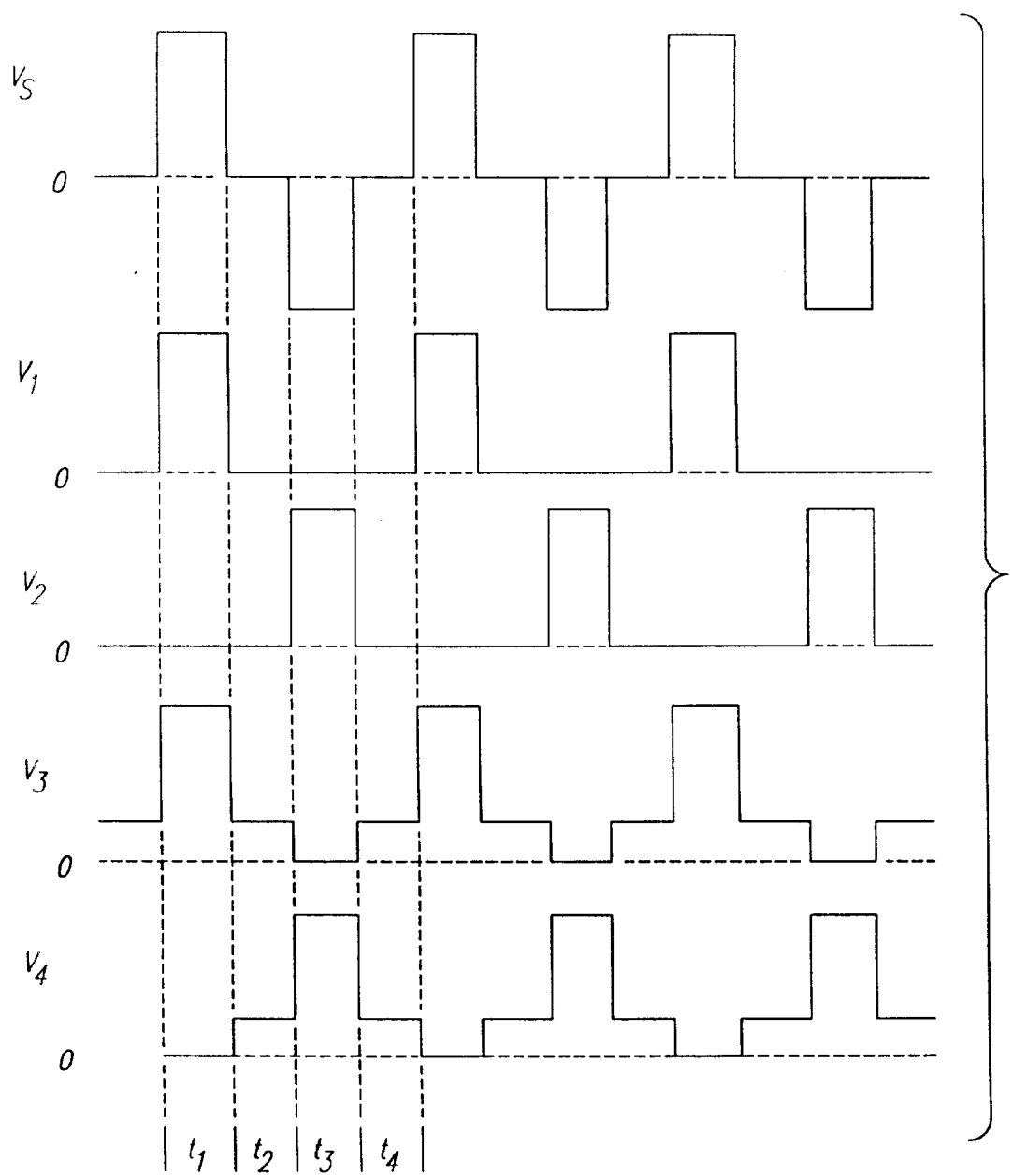
FIG. 4 illustrates waveforms depicting operation of the self-driven synchronous rectification circuit of FIG. 3.

During a first portion of the duty cycle, the first switch 122 is turned off and the second switch 124 is turned on. This connects the second end of the transformer primary winding 112 to ground with the first end of the transformer primary winding connected to the midpoint between the capacitors 126, 128. As a result, a positive voltage is formed across the transformer primary winding 112 with the voltage at the first end positive with respect to the voltage at the second end. During a second portion of the duty cycle, the first switch 122 is turned on and the second switch 124 is turned off. This connects the second end of the transformer primary winding 112 to the input voltage with the first end of the transformer primary winding connected to the midpoint between the capacitors 126, 128. As a result, a negative voltage is formed across the transformer primary winding 112 with the voltage at the first end negative with respect to the voltage at the second end. The timing control circuit 130 controls the duty cycle timing in order to provide a primary drive voltage waveform as shown in FIG. 4 (described below), which is equivalent to the drive voltage waveform shown in FIG. 2 (described above).

The half-bridge forward converter driving circuit shown in FIG. 3 is advantageous since it reduces the input voltage by half, thereby enabling a high ratio between input and output voltages without using such a big transformer ratio. As known in the art, a 4:1 transformer ratio is easier to provide than an 8:1 transformer ratio. Nevertheless, it should be appreciated that various alternative known symmetrical primary driving circuit topologies could also be utilized, such as a full-bridge forward converter, a push-pull converter, and the like.

On the secondary side of the transformer, a self-driven synchronous rectification circuit in accordance with the present invention is provided. The synchronous rectification circuit has an output terminal coupled to the first end A of the first secondary winding 114 through a first output storage choke 142 and to the second end B of the first secondary winding through a second output storage choke 144. An output voltage ($V_o$) may be derived across a load resistor 148 coupled between the output terminal and ground. A capacitor 146 is coupled between the output terminal and ground to filter high frequency components of the rectified output voltage. As in the prior art circuit, this synchronous rectification circuit includes first and second rectifiers 156, 158 that are each provided by MOSFET devices. The first rectifier 156 has a drain terminal connected to the first end A of the first secondary winding 114 and the second rectifier 158 has a drain terminal connected to a second end B of the first secondary winding 114. The gate terminal of the first rectifier 156 is connected to the first end C of the second secondary winding 116, and the gate terminal of the second rectifier 158 is connected to the second end D of the second secondary winding 116. The source terminals of the first and second rectifiers 156, 158 are each coupled to ground.

The synchronous rectification circuit further includes two additional switches 152, 154 that are provided by MOSFET devices. The first switch 152 has a drain terminal connected to the gate terminal of the first rectifier 156, and the second switch 154 has a drain terminal connected to the gate terminal of the second rectifier 158. The gate terminal of the first switch 152 is connected to the second end D of the second secondary winding 116, and the gate terminal of the second switch 154 is connected to the first end C of the second secondary winding 116. The source terminals of the first and second switches 152, 154 are each coupled to ground. As shown in FIG. 3, each of the first and second rectifiers 156, 158 and the first and second switches 152, 154 include a respective body diode between drain and source terminals thereof.

The operation of the synchronous rectification circuit of FIG. 3 on the secondary side of the DC-DC converter will now be described with reference to the waveforms depicted in FIG. 4. Specifically, FIG. 4 depicts the following waveforms: (a) the primary driving voltage ($V_S$) across the transformer; (b) the voltage ($V_1$) between drain and source of the first rectifier 156; (c) the voltage ($V_2$) between drain and source of the second rectifier 158; (d) the voltage ($V_3$) between drain and source of the second switch 154, i.e., the voltage between gate and source of the second rectifier 158; and (e) the voltage ($V_4$) between drain and source of the first switch 152, i.e., the voltage between gate and source of the first rectifier 156. The waveforms are each divided into four time periods (i.e., $t_1$ through $t_4$).

During the first time period ($t_1$), the voltage across the primary winding 112 of the transformer is positive, providing a positive voltage across the first secondary winding 114 and a negative voltage across the second secondary winding 116. This causes the first switch 152 to turn on, which pulls the gate terminals of the second switch 154 and the first rectifier 156 to ground to thereby turn off these devices. At the same time, the voltage across the second secondary winding 116 turns on the second rectifier 158. As a result, two current loops are formed in the synchronous rectification circuit in this first time period. A first current loop contains current flowing from the first secondary winding 114 to the first storage choke 142, the load resistance 148, and back to the first secondary winding through the channel formed by the conducting second rectifier 158. A second current loop contains magnetization current stored in the second storage choke 144 that flows through the load resistance 148 and the channel formed by the second rectifier 158.

During the second time period ($t_2$), the voltage across the primary winding 112 goes to zero, and the voltages across the first secondary winding 114 and the second secondary winding 116 disappears. The gate terminals of the second rectifier 158 and the first switch 152 maintain a residual charge remaining from the first time period ($t_1$). The second secondary winding 116 forms an effective short circuit between the gate terminals of the first and second switches 152, 154 and the first and second rectifiers 156, 158. The charge on the gate terminals of the second rectifier 158 and the first switch 152 is distributed through the second secondary winding 116 to thereby increase the voltage on the gate terminals of the first rectifier 156 and the second switch 154. Thus, the voltages on the gate terminals of the second rectifier 158 and the first switch 152 decrease while the voltages on the gate terminals of the first rectifier 156 and the second switch 154 increase, until the voltages on all four gate terminals have equalized. The four MOSFET devices are selected so that the rectifiers 156, 158 have a lower gate threshold than that of the switches 152, 154.

At the equalization voltage of the four gate terminals, the two switches 152, 154 are turned off and the two rectifiers 156, 158 are turned on, thereby forming three current loops in the synchronous rectification circuit. A first current loop contains magnetization current stored in the first storage choke 142 that flows through the load resistance 148 and back through the channel formed by the conducting first rectifier 156. A second current loop contains magnetization current stored in the second storage choke 142 that flows through the load resistance 148 and the channel formed by the conducting second rectifier 158. A third current loop contains magnetization current stored in the first secondary winding 114 that flows through the channels formed by the conducting first and second rectifiers 156, 158.

At the start of the third time period ($t_3$), the two switches 152, 154 are turned off and the two rectifiers 156, 158 are turned on. The voltage across the primary winding 112 of the transformer turns negative, providing a negative voltage across the first secondary winding 114 and a positive voltage across the second secondary winding 116. Since the gate terminals of the two switches 152, 154 were already close to their thresholds, a slight increase in voltage at the gate terminal of the second switch 154 at the transition to the third time period ($t_3$) causes the second switch 154 to turn on quickly. This pulls the gate terminals of the first switch 152 and the second rectifier 158 to ground to thereby turn off these devices and stop the flow of current from the first secondary winding 114 through the second rectifier 158. At the same time, the negative voltage across the second secondary winding 116 keeps the first rectifier 156 turned on. As a result, two current loops are formed in the synchronous rectification circuit in this third time period ($t_3$). A first current loop contains current flowing from the first secondary winding 114 to the second storage choke 144, the load resistance 148, and back to the first secondary winding through the channel formed by the conducting first rectifier 156. A second current loop contains magnetization current stored in the first storage choke 142 that flows through the load resistance 148 and the channel formed by the first rectifier 156.

During the fourth time period ($t_4$), the voltage across the primary winding 112 again goes to zero, and the voltages across the first secondary winding 114 and the second secondary winding 116 disappears. The gate terminals of the first rectifier 156 and the second switch 154 maintain a residual charge remaining from the third time period ($t_3$). As in the second time period ($t_2$), the second secondary winding 116 forms an effective short circuit between the gate terminals of the four MOSFET devices. The charge on the gate terminals of the first rectifier 156 and the second switch 154 is distributed through the second secondary winding 116 to thereby increase the voltage on the gate terminals of the second rectifier 158 and the first switch 152. Thus, the voltages on the gate terminals of the first rectifier 156 and the second switch 154 decrease while the voltages on the gate terminals of the second rectifier 158 and the first switch 152 increase, until the voltages on all four gate terminals have equalized. At the equalization voltage, the two switches 152, 154 are turned off and the two rectifiers 156, 158 are turned on, thereby forming three current loops in the synchronous rectification circuit in the same manner as described above.

As the first time period ($t_1$) begins again, the two switches 152, 154 are turned off and the two rectifiers 156, 158 are turned on. The voltage across the primary winding 112 of the transformer turns positive, providing a positive voltage across the first secondary winding 114 and a negative voltage across the second secondary winding 116. Since the gate terminals of the two switches 152, 154 were already close to their thresholds, a slight increase in voltage at the gate terminal of the first switch 152 at the transition to the first time period ($t_1$) causes the first switch 152 to turn on quickly. This pulls the gate terminals of the second switch 154 and the first rectifier 156 to ground to thereby turn off these devices and stop the flow of current from the first secondary winding 114 through the first rectifier 156. At the same time, the positive voltage across the second secondary winding 116 keeps the second rectifier 158 turned on. The power conduction cycle continues to repeat in the same manner described above.

The self-driven synchronous rectification circuit is advantageous over the prior art in two significant ways. First, during the second and fourth time periods of the power conduction cycle, the synchronous rectifiers 156, 158 remain turned on to reduce conduction losses through the body diodes of these MOSFET devices. Second, during the transitions from the second time period to the third time period and from the fourth time period to the first time period, the gate voltages of the switches 152, 154 are already at the threshold so the transition from off to on is immediate. This results in a fast turn off of one of the rectifiers 156 or 158 and thereby reduces the amount of current circulating in the loop including the first secondary winding 114 and the rectifiers 156, 158 that otherwise circulates at many times higher than normal current levels.

Having thus described a preferred embodiment of self-driven synchronous rectification circuit for low output voltage DC-DC converters, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A power converter, comprising:
    a primary side power circuit providing a symmetrically varying power signal that remains at a zero voltage level for a portion of a conduction cycle;
    a first secondary side power circuit inductively coupled to said primary side power circuit, said first secondary side power circuit providing an output voltage, said first secondary side power circuit comprising first and second synchronous rectifiers having respective activation terminals and being alternately activating in synchronism with non-zero voltage level portions of said conduction cycle; and
    a second secondary side power circuit inductively coupled to said first secondary side power circuit and having a polarity reversed with respect to said first secondary side power circuit, said second secondary side power circuit comprising first and second switches having respective activation terminals respectively coupled to said activation terminals of said first and second synchronous rectifiers and being alternately activating in inverse synchronism with said non-zero voltage level portions of said conduction cycle, said first and second synchronous rectifiers having lower activation voltage thresholds than said first and second switching devices;
    wherein, during a zero voltage level portion of said conduction cycle, residual charge remaining on any one of said activation terminals of said first and second synchronous rectifiers and said first and second switches is distributed through said second secondary side power circuit to remaining ones of said activation terminals to cause both said first and second synchronous rectifiers to be activated during said zero voltage level portion while both said first and second switching devices are turned off, and during a subsequent non-zero voltage level portion of said conduction cycle, one of said first and second switches is activated causing one of said first and second synchronous rectifiers to be deactivated.

2. The power converter of claim 1, wherein said first and second synchronous rectifiers further comprise MOSFET devices.

3. The power converter of claim 1, wherein said first and second switching devices further comprise MOSFET devices.

4. The power converter of claim 1, wherein said activation terminals of said first and second switching devices are at an equilibrium voltage close to said activation voltage threshold of said first and second switching devices during zero voltage portions of said conduction cycle, one of said first and second switching devices thereby activating rapidly upon a transition to one of said non-zero voltage portions of said conduction cycle.

5. The power converter of claim 4, wherein an activation of one of said first and second switching devices following a transition to one of said non-zero voltage portions of said conduction cycle causes a deactivation of a corresponding one of said second and first synchronous rectifiers.

6. The power converter of claim 1, wherein said activation terminals of said first and second switching devices are coupled to said activation terminals of said second and first synchronous rectifiers, respectively.

7. The power converter of claim 1, wherein said primary side power circuit further comprises a half-bridge forward converter driving circuit.

8. A method of rectifying a symmetrically varying power signal that remains at a zero voltage level for a portion of a conduction cycle in a DC-DC converter including first and second synchronous rectifiers having respective activation terminals, comprising:
    activating one of said first and second synchronous rectifiers during a non-zero voltage portion of said conduction cycle;

maintaining said activated one of said first and second synchronous rectifiers in an activated state and activating the other one of said first and second synchronous rectifiers during a zero voltage portion of said conduction cycle immediately following said non-zero voltage portion by distributing residual charge remaining on one of said activation terminals to the other one of said activation terminals; and upon transition to a subsequent non-zero voltage portion of said conduction cycle, deactivating said activated one of said first and second synchronous rectifiers by conducting said residual charge on a corresponding one of said activation terminals to ground and maintaining the other one of said first and second synchronous rectifiers in an activated state.

9. The method of claim 8, wherein said first and second synchronous rectifiers further comprise respective activation terminals provided in a secondary circuit isolated from an output terminal of said DC-DC converter, said step of maintaining at least said activated one of said first and second synchronous rectifiers in an activated state further comprising distributing charge on said activation terminals within said secondary circuit.

10. The method of claim 9, wherein said step of inducing a voltage to deactivate said activated one of said first and second synchronous rectifiers further comprises conducting said charge to ground.

11. The method of claim 8, wherein said step of maintaining at least said activated one of said first and second synchronous rectifiers in an activated state further comprises activating both said first and said second synchronous rectifiers during said zero voltage portion of said conduction cycle.

12. The method of claim 8, wherein said first and second synchronous rectifiers further comprise MOSFET devices having respective internal body diodes, said step of maintaining at least said activated one of said first and second synchronous rectifiers in an activated state further comprises conducting current through a channel of said MOSFET devices during said zero voltage portion of said conduction cycle and not through said respective internal body diodes.

13. A synchronous rectification circuit for use in a DC-DC power converter having a primary side power circuit providing a symmetrically varying power signal that remains at a zero voltage level for a portion of a conduction cycle, comprising:

a first secondary side power circuit inductively coupled to said primary side power circuit, said first secondary side power circuit providing an output voltage, said first secondary side power circuit comprising first and second synchronous rectifiers having respective activation terminals and being alternately activating in synchronism with non-zero voltage level portions of said conduction cycle; and a second secondary side power circuit inductively coupled to said first secondary side power circuit and having polarity reversed with respect to said first secondary side power circuit, said second secondary side power circuit comprising first and second switching devices having respective activation terminals respectively coupled to said activation terminals of said first and second synchronous rectifiers and being alternately activating in inverse synchronism with said non-zero voltage level portions of said conduction cycle, said first and second synchronous rectifiers having lower activation voltages thresholds than said first and second switching devices;

wherein, during a zero voltage level portion of said conduction cycle, residual charge remaining on any one of said activation terminals of said first and second synchronous rectifiers and said first and second switches is distributed through said second secondary side power circuit to remaining ones of said activation terminals to cause both said first and second synchronous rectifiers to be activated during said zero voltage level portion while both said first and second switching devices are turned off, and during a subsequent non-zero voltage level portion of said conduction cycle, one of said first and second switches is activated causing one of said first and second synchronous rectifiers to be deactivated.

14. The synchronous rectification circuit of claim 13, wherein said first and second synchronous rectifiers further comprise MOSFET devices.

15. The synchronous rectification circuit of claim 13, wherein said first and second switching devices further comprise MOSFET devices.

16. The synchronous rectification circuit of claim 13, wherein said activation terminals of said first and second switching devices are at an equilibrium voltage close to said activation voltage threshold of said first and second switching devices during zero voltage portions of said conduction cycle, one of said first and second switching devices thereby activating rapidly upon a transition to one of said non-zero voltage portions of said conduction cycle.

17. The synchronous rectification circuit of claim 16, wherein an activation of one of said first and second switching devices following a transition to one of said non-zero voltage portions of said conduction cycle causes a deactivation of a corresponding one of said second and first synchronous rectifiers.

18. The synchronous rectification circuit of claim 13, wherein said activation terminals of said first and second switching devices are coupled to said activation terminals of said second and first synchronous rectifiers, respectively.

19. The synchronous rectification circuit of claim 13, wherein said primary side power circuit further comprises a half-bridge forward converter driving circuit.

20. The synchronous rectification circuit of claim 14, wherein said first and second synchronous rectifiers further comprise respective internal body diodes, said first and second synchronous rectifiers conducting current while, thereby avoiding conduction of current through said respective internal body diode while in said zero voltage level portion of said conduction cycle.

21. A power converter comprising:

a primary side power circuit providing a periodically varying power signal; and a secondary side power circuit inductively coupled to said primary side circuit, said secondary side power circuit including:

a first secondary transformer winding and a second secondary transformer winding inductively coupled to each other;

first and second switches having respective activation terminals connected to respective ends of said second secondary transformer winding, and first and second synchronous rectifiers having respective activation terminals connected to respective ends of said second secondary transformer winding and to said activation terminals of said second and first switches, respectively, said first and second synchronous rectifiers having respective lower activation voltage thresholds than said first and second switches;

wherein, during a zero voltage level portion of said power signal, residual charge remaining on any one of said activation terminals of said first and second synchronous rectifiers and said first and second switches is distributed through said second secondary side power circuit to remaining ones of said activation terminals to cause both said first and second synchronous rectifiers to be activated during said zero voltage level portion while both said first and second switching devices are turned off.

22. The power converter of claim 21, wherein said primary side power circuit provides a symmetrically varying power signal that remains at a zero voltage level for a portion of a conduction cycle and a non-zero voltage level for another portion of said conduction cycle.

23. The power converter of claim 22, wherein said synchronous rectifiers alternately activate in synchronism with said non-zero voltage level portion of said conduction cycle.

24. The power converter of claim 22, wherein during said zero voltage level portion of said conduction cycle said synchronous rectifiers are activated and said switches are turned off.

25. The power converter of claim 22, wherein during a successive non-zero voltage portion of said conduction cycle, said primary side circuit induces a voltage on said second secondary transformer winding, said induced voltage turning on one of said switches.

26. The power converter of claim 25, wherein said turned on switch grounds said activation terminal of one of said rectifiers to thereby deactivate said grounded rectifier.

27. The power converter of claim 21, wherein said second secondary transformer winding drives both of said first and second switches.

28. The power converter of claim 21, wherein said second secondary transformer winding has current flow in two directions.

* * * * *